United States Patent
Selling et al.

(10) Patent No.: US 6,916,896 B2
(45) Date of Patent: Jul. 12, 2005

(54) HIGH PRODUCTIVITY SPANDEX FIBER PROCESS AND PRODUCT

(75) Inventors: Gordon W. Selling, Dunlap, IL (US); Nathan E. Houser, Afton, VA (US)

(73) Assignee: Invista North America S.a.r.l., Wilmington, DE (US)

( * ) Notice: Subject to any disclaimer, the term of this patent is extended or adjusted under 35 U.S.C. 154(b) by 0 days.

(21) Appl. No.: 10/430,060

(22) Filed: May 5, 2003

(65) Prior Publication Data

US 2004/0225101 A1 Nov. 11, 2004

(51) Int. Cl.⁷ .................... C08G 18/76; C08G 18/10; C08G 18/32; C08G 18/42; C08G 18/48
(52) U.S. Cl. .................... 528/49; 528/61; 528/67; 528/76; 528/80; 528/83; 528/906
(58) Field of Search .................... 528/49, 61, 67, 528/76, 80, 83, 906

(56) References Cited

U.S. PATENT DOCUMENTS

| | | | |
|---|---|---|---|
| 3,184,426 A | | 5/1965 | Thoma et al. |
| 3,475,377 A | | 10/1969 | Rosendahl et al. |
| 3,557,044 A | | 1/1971 | Bleasdale et al. |
| 3,631,138 A | | 12/1971 | Peters |
| 3,669,934 A | * | 6/1972 | Epstein et al. .................. 528/83 |
| 4,973,647 A | | 11/1990 | Bretches et al. |
| 5,000,899 A | | 3/1991 | Dreibelbis et al. |
| 5,032,664 A | | 7/1991 | Frauendorf et al. |
| 5,061,426 A | * | 10/1991 | Frauendorf et al. .......... 264/205 |
| 5,539,037 A | | 7/1996 | Iqbal |
| 5,644,015 A | | 7/1997 | Seo et al. |
| 5,723,563 A | | 3/1998 | Lawrey et al. |
| 5,843,357 A | | 12/1998 | Seneker et al. |
| 5,879,799 A | | 3/1999 | Yosizato et al. |
| 5,948,875 A | | 9/1999 | Liu et al. |
| 5,981,686 A | | 11/1999 | Waldbauer, Jr. |
| 6,403,682 B1 | | 6/2002 | Goodrich et al. |
| 6,472,494 B2 | | 10/2002 | Houser et al. |
| 6,624,281 B1 | * | 9/2003 | Lawrey ....................... 528/61 |
| 6,637,181 B1 | * | 10/2003 | Korte et al. .................. 57/200 |
| 6,639,041 B2 | * | 10/2003 | Nishikawa et al. ........... 528/61 |
| 6,692,828 B2 | | 2/2004 | Song et al. |
| 6,720,403 B1 | * | 4/2004 | Houser ....................... 528/85 |
| 6,737,497 B2 | * | 5/2004 | Lawrey et al. ................ 528/61 |
| 2002/0161137 A1 | * | 10/2002 | Wilkinson .................. 525/453 |
| 2002/0193550 A1 | | 12/2002 | Nishikawa et al. |
| 2003/0224683 A1 | * | 12/2003 | Lawrey ..................... 442/182 |
| 2003/0225242 A1 | * | 12/2003 | Lawrey et al. ............... 528/65 |

FOREIGN PATENT DOCUMENTS

| | | |
|---|---|---|
| GB | 1102819 | 2/1968 |
| JP | 07-082608 | 3/1995 |
| JP | 08-020625 | 1/1996 |
| JP | 08-176268 | 7/1996 |
| WO | WO 02/086208 | 10/2002 |

* cited by examiner

Primary Examiner—Rabon Sergent
(74) Attorney, Agent, or Firm—Robert B. Furr, Jr.; Anne I. Breikss

(57) ABSTRACT

Commercially acceptable spandex can be prepared with greater efficiency, improved consistency and at lower costs from a high-solids content polyurethaneurea polymer solution. The polyurethaneurea is prepared using a combination of 4,4'-MDI and 2,4'-MDI, and an amount of chain extenders and chain terminators such that the polymer solution, prior to spinning, is highly soluble and has an appropriate prespun IV and primary amine content.

26 Claims, No Drawings

HIGH PRODUCTIVITY SPANDEX FIBER PROCESS AND PRODUCT

FIELD OF THE INVENTION

The present invention relates to a highly soluble polyurethaneurea prepared from: (a) at least one polymeric glycol; (b) a diisocyanate mixture comprising: (i) at least about 78 mole percent 1-isocyanato-4-[(4-isocyanatophenyl)methyl]benzene (4,4'-MDI); and (ii) at least about 5 mole percent 1-isocyanato-2-[(4-isocyanatophenyl)methyl]benzene (2,4'-MDI); (c) at least one chain extender; and (d) at least one amine chain terminator. These high-solids polymer solutions comprising said polyurethaneurea can be used to dramatically increase the productivity of spandex manufacture without sacrificing fiber properties. The present invention also relates to a method of producing spandex fiber from a high-solids solution of said polyurethaneurea and to the spandex fibers thus formed.

BACKGROUND

Spandex is the generic name for manufactured fiber in which the fiber-forming substance is a long-chain synthetic polymer comprised of at least 85% of a segmented polyurethane. For the sake of convenience, and not of limitation, the present invention herein is discussed in terms of spandex, but should be construed to include all embodiments described in the following disclosure and their equivalents.

Spandex is typically prepared in two steps. First a low molecular weight difunctional polymer, such as a polymeric glycol, is allowed to react with a diisocyanate to form a mixture of isocyanate-terminated prepolymer and unreacted diisocyanate ("capped glycol"). The capped glycol is then dissolved in a suitable solvent and reacted with a difunctional chain extender and monofunctional chain terminator composition to form a polyurethaneurea polymer solution. Commercial spandex fiber is then formed from the resulting polyurethaneurea solution using conventional dry-spinning or wet-spinning techniques.

By preparing the polymer in this manner, spandex comprises so-called "hard" segments derived from the reaction between an isocyanate group on the capped glycol and the chain extender. Spandex also comprises "soft" segments derived primarily from the polymeric glycol. It is believed that the desirable elastomeric properties of spandex are due, in part, to this segmented structure.

While both ends of a chain extender, like ethylenediamine, may react with isocyanate groups from the capped glycol, in certain cases only one end of the chain extender may react. The result is a polymer having a chain extender with a primary amine at one end. The number of these "chain extender ends" (CE), expressed as the concentration of ends in milliequivalents per kilogram of polymer, can be determined by measuring the concentration of primary amine in the polymer. Primary amine content can be assayed using conventional techniques.

The number of chain extender ends can be controlled by several means, such as by varying the stoichiometry of chain extender to capped glycol. Alternatively, the number of chain extender ends can be controlled using a chain terminator, such as diethylamine (DEA). A chain terminator reacts with the capped glycol, in the same manner as a chain extender, but does not have a second reactive group. The result is a polymer with a chain terminator end rather than a chain extender end.

By controlling the stoichiometry of chain extender and chain terminator to isocyanate functionalities in the capped glycol, it is possible to adjust the total number of polymer ends and, therefore, the molecular weight and intrinsic viscosity (IV) of the polymer. This is known to be an effective method of controlling the molecular weight and IV of a polyurethaneurea. See, for example, U.S. Pat. No. 3,557,044, the disclosure of which is incorporated herein by reference.

The combination of a desired number of polymer ends with a desired proportion of those being chain extender ends, is an aspect of the present invention and can be described in terms of polymer properties normally measured in the art. As stated previously, the total number of polymer ends is directly proportional to the IV. The greater the number of polymer ends, the lower the molecular weight and the lower the IV. Similarly, the number of chain extender ends is related to the quantity of primary amine in the polymer. Thus, describing aspects of the present invention in terms of desirable IV and amount of primary amine, is the equivalent to describing those aspects in terms of the desirable number of polymer ends and chain extender ends, respectively. The reader is directed to the Examples for further details.

Spandex fiber can be formed from the polyurethaneurea through fiber spinning processes such as dry spinning. In dry spinning, a polymer solution comprising a polymer and solvent is metered through spinneret orifices into a spin chamber to form a filament or filaments. Gas is passed through the chamber to evaporate the solvent to solidify the filament(s). Multiple filaments can then be coalesced into a spandex yarn.

Solvents used in polymer solutions should provide a homogeneous solution containing little or no gels. Solvents particularly suitable for dry spinning include N,N-dimethylacetamide (DMAc), N-methylpyrrolidinone (NMP), N,N-dimethylformamide (DMF) and dimethyl sulfoxide (DMSO). Because of safety and cost concerns DMAc is preferred and, indeed, used almost exclusively in the industry.

The productivity of dry spinning is typically described in terms of grams of yarn per spin chamber per hour and is related to winding speed, yarn and filament deniers and to the number of yarns per spin chamber. Such parameters, however, are limited by the volume and solvent used in the polymer solution and the rate of solvent evaporation through the surface of each filament. The rate of evaporation, in turn, is related to the filament denier and to the number of filaments within the spin chamber. For example, an increase in filament denier, while maintaining the total yarn denier, means a decrease in overall filament surface area and a slower rate of solvent evaporation. Winding speed must be reduced in such cases to allow sufficient time for the solvent to evaporate within the spin chamber. Also, the more filaments in a spin chamber, the larger the volume of gas and solvent vapor that must be handled. High volumes of gas induce turbulence which reduces fiber uniformity, process continuity, and productivity. Further, the volume of solvent used and its rate of evaporation from the filaments may affect the physical properties of the spandex fiber such as tenacity.

It has long been recognized that if the amount of solvent used in dry spinning could be reduced (i.e., use a polymer solution with a higher percent solids), the spinning productivity would improve because there would be less solvent to evaporate from the filaments. However, a polymer solution suitable for spandex yarn production containing a maximum of only about 37 percent solids has been possible. Over the years, attempts to prepare more concentrated polymer solutions have been commercially unsuccessful because the polyurethaneurea is insoluble in DMAc above about 37 weight percent. Polymer solutions that contain more than 37 percent solids may exist, initially, but such solutions are unstable and either quickly build viscosity until they exceed the handling capability of process equipment or form gels and become insoluble. Even in those prior cases when manufacturers were actually able to produce spandex from high-solids polymer solutions, the productivity was poor and fiber had unacceptably poor properties.

To be commercially acceptable, spandex fiber must meet certain properties recognized in the industry. While small markets may exist for spandex that does not meet these properties, such niche applications are quite limited and it is the purpose of the present invention to have a broad application in the spandex industry. These properties are appreciated by those skilled in the art and include, for example for spandex at 40 denier: IV greater than 1.1 dl/g; Tenacity at least 40 g; Load Power (1TP2) less than 7 g; Unload Power (5TM2) at least 0.9 g; and a coefficient of denier variation (CDV) less than 15.

Those skilled in the art will appreciate that properties for commercially. acceptable spandex will vary with denier so the above illustration of commercially acceptable spandex "at 40 denier" is not to be construed to limit the present invention either to these properties or to 40 denier spandex. The present invention includes commercially acceptable spandex of other deniers which would have the above-stated properties if they were prepared at 40 denier. Accordingly, reference herein to properties of spandex at 40 denier includes spandex of different denier which would have the recited property if prepared at 40 denier.

Thus, until the present invention there remained a need to improve spandex spinning productivity by reducing solvent volumes (increasing percent solids), but without adversely affecting the spinning process or the quality of the spandex fiber.

SUMMARY OF THE INVENTION

It was surprisingly found that a ratio of 4,4'-MDI to 2,4'-MDI, coupled with the appropriate polymer IV (i.e., total ends) and primary amine content (i.e., chain extender ends) provided a polyurethaneurea which could be dry spun into commercially acceptable spandex from a polymer solution containing 45 percent solids, or more. It was further surprisingly discovered that the high-solids content polymer solutions of the present invention could be spun into commercially acceptable spandex fiber at greatly increased spinning productivity and with better product consistency. Indeed, the present invention can provide significant productivity increases with a simultaneous reduction in raw material, energy and waste treatment costs.

The present invention relates to a polyurethaneurea for use in a high-solids content polymer solution for the production of spandex fiber. Another aspect of the invention is an improved method for producing spandex fiber from a high-solids content polyurethaneurea polymer solution. Yet another aspect of the invention is a commercially acceptable spandex fiber produced by dry spinning a high-solids content polyurethaneurea polymer solution.

More particularly, the polyurethaneurea of the present invention, prior to spinning has an IV between about 0.65 and about 0.90 dl/g, a primary amine content between about 25 and about 55 milliequivalents NH$_2$ per kilogram of polymer solids (meq/Kg), and is prepared from: at least one polymeric glycol; a diisocyanate mixture comprising at least about 78 mole percent 4,4'-MDI and at least about 5 mole percent 2,4'-MDI; at least one chain extender; and at least one amine chain terminator.

The high-solids content polymer solution of the present invention comprises a DMAc solution that is greater than 38 weight percent of said polyurethaneurea.

DETAILED DESCRIPTION OF THE INVENTION

It has now been unexpectedly found that the productivity of manufacturing spandex fiber can be improved dramatically by first preparing a highly soluble polyurethaneurea having a desirable IV (i.e., total ends) and a desirable primary amine content (i.e., chain extender ends), and then preparing a polymer solution comprising said polyurethaneurea in greater than 38 weight percent. Commercially acceptable spandex filaments can be prepared from this polymer solution at rates that significantly exceed rates conventionally used with 37 or less weight percent solutions.

More particularly, the polyurethane urea of the present invention is prepared from:

(a) at least one polymeric glycol selected from the group consisting of polyether glycols and polyester glycols;

(b) a diisocyanate mixture comprising at least about 78 mole percent 4,4'-MDI and at least about 5 mole percent 2,4'-MDI;

(c) at least one chain extender; and (d) at least one amine chain terminator;

wherein the mole ratio of (a) to (b), known as the "capping ratio," is between about 1:1.5 and about 1:2, preferably between about 1:1.6 and about 1:1.8, more preferably between about 1:1.65 and about 1:1.75; wherein further, the at least one chain extender (c) and the at least one amine chain terminator (d) are present in amounts such that the polyurethaneurea, prior to spinning, has an IV less than 0.9 with a primary amine content of between about 25 and about 55 meq/Kg, preferably between about 25 and about 45 meq/Kg, and most preferably about 40 meq/Kg.

The polyether glycols suitable for use in the present invention have number average molecular weights of from about 1500 to about 4000, preferably from about 1600 to about 2500, and more preferably from about 1800 to about 2000. Useful polyether glycols include, but are not limited to, polyethyleneether glycol, polytrimethyleneether glycol, polytetramethyleneether glycol, polytetramethylene-co-2-methyl-tetramethyleneether glycol, polytetramethylene-co-ethylene glycol, and mixtures thereof. Most preferred is polytetramethylene glycol such as TERATHANE® 1800 (available from Dupont Co.).

Useful polyester glycols include, but are not limited to, copoly(ethylene-butylene adipate) diol, poly(2,2-dimethylpropylene dodecanoate) diol, hydroxy-terminated reaction products of diols such as ethylene glycol, 1,3-propane diol, 1,4-butane diol, 1,6-hexane diol, 2,2-dimethyl-1,3-propane diol, 3-methyl-1,5-pentane diol, and mixtures thereof.

A mixture of diisocyanates is used to make the polyurethaneurea of the present invention. One component of the diisocyanate mixture is 4,4'-MDI present in at least about 78 mole percent, preferably from about 80 to about 95 mole percent, most preferably about 83 to about 91 mole percent. A second component of the diisocyanate mixture is 2,4'-MDI present in at least about 5 mole percent, preferably from about 7 to about 20 mole percent, more preferably from about 9 to about 17 mole percent. It is preferred that there be less than 1 mole percent 2,2'-MDI in the mixture of diisocyanates.

Optionally, other isocyanates could be used in combination with 4,4'-MDI and 2,4'-MDI, such as 2,2'- and 2,4'-toluenediisocyanate In making the capped glycol, the diisocyanate mixture can be added all at once or in two or more steps and in any order. If desired, dibutyltin dilaurate, stannous octoate, mineral acids, tertiary amines such as triethylamine, N,N'-dimethylpiperazine, and the like, and other known catalysts can be used to assists in the capping step. The capped glycol is then added to a suitable solvent such as DMAc, DMF, DMSO, N-methylpyrrolidinone (NMP), and the like, including mixtures. DMAc is preferred.

A single chain extender or a mixture of chain extenders may be used to prepare the polyurethaneurea of the present invention from the capped glycol. If a single chain extender is used, it is preferably ethylenediamine (EDA). If a mixture of chain extenders is used, the mixture should comprise at least about 90 mole percent EDA as a primary chain extender and further include one or more secondary chain extenders. Examples of secondary chain extenders include 2-methyl-1,5-pentanediamine (MPMD commercially available as DYTEK® A, available from DuPont), 1,2-propanediamine (PDA), 1,3-butanediamine, 1,4-butanediamine, 1,3-diamino-2,2-dimethylbutane, 1,6-hexanediamine, 1,3-propanediamine, N-methylaminobis(3-propylamine) 2-methyl-1,5-pentanediamine, 1,5-diaminopentane, 1,4-cyclohexanediamine, 1,3-diamino-4-methylcyclohexane, 1,3-cyclohexanediamine, 1,1'-methylene-bis(4,4'-diaminohexane), 1,3-diaminopentane, piperazine, cyclohexylene-1,3-diamine (hydrogenated m-phenylene diamine), isophorone diamine, 1,4-diamino-2-methylpiperazine, 1,4-diamino-2,5-dimethylpiperazine, and methyl bispropylamine; and mixtures thereof. Preferred secondary chain extenders are MPMD and PDA. MPMD is most preferred.

Suitable chain terminators include secondary amines, for example diethylamine (DEA), diisopropylamine, piperidine, dibutylamine, and mixtures thereof. DEA is preferred.

In making the polyurethaneurea of the present invention, the chain extender and chain terminators can be added all at once or in two or more steps, preferably all at once. It is preferred that the chain extender(s) and chain terminator(s) be dissolved in a suitable solvent, as defined above. DMAc is the preferred solvent.

An effective amount of a variety of additives can also be used in the spandex of the invention, provided they do not detract from the beneficial aspects of the invention. Examples include delustrants such as titanium dioxide and stabilizers such as hydrotalcite, a mixture of huntite and hydromagnesite, barium sulfate, hindered phenols, and zinc oxide, dyes and dye enhancers, antimicrobials, antitack agents, silicone oil, hindered amine light stabilizers, UV screeners, and the like.

To realize the benefits of the present invention, the polymer solution which is dry spun into spandex should have a percent solids content greater than 38 and less than 50 weight percent, preferably between about 40 and about 48 weight percent, more preferably about 45 weight percent.

For practical purposes, polymer solution may be stored after initial preparation for periods of 2 to 48 hours prior to spinning, typically at temperatures below 50° C. During this time, the viscosity should not increase excessively to minimize negative impact on spinning performance and yarn properties. The 40° C. Falling ball viscosity of the polymers of this invention, therefore, increase less than 2000 poises, preferably less than 1500 poises, more preferably less than 1000 poises, when stored at 40° C. for 24 hours.

Another feature of the present invention is that the intrinsic viscosity of the polyurethaneurea, prior to spinning ("pre-spun IV"), is less than the IV of commercially acceptable spandex fiber. The pre-spun IV should be between about 0.65 and about 0.90 dl/g, preferably between about 0.70 and about 0.80, and most preferably about 0.75.

Another feature of the present invention is that the amount of chain extender ends in the polyurethaneurea solution (expressed as primary amine content), prior to spinning, is about 25 to about 55 meq/Kg, preferably about 35 to about 45, more preferably about 40.

Using the present invention, the productivity of commercial spandex production can be increased dramatically while simultaneously using less solvent, less gas and less energy. Additionally, the product is more consistent, as measured by coefficient of denier variation, and generates less waste.

The following examples demonstrate that the present invention enables high-solids, high-productivity spinning while achieving or exceeding the required polymer and fiber properties of prior art spandex spinning processes. These examples are intended to be illustrative of the present invention. Other objects and advantages of the present invention will become apparent to those skilled in the art. As will be realized, the present invention is capable of other and different embodiments, and its several details are capable of modifications in various apparent respects, without departing from the scope and spirit of the present invention. Accordingly, the examples are to be regarded as illustrative in nature and not as restrictive.

EXAMPLES

Preparation of Polyurethaneurea

The polyurethaneurea polymers in the examples were prepared according to the following general method. A stoichiometric excess of the diisocyanate mixture was mixed with a polymeric glycol and heated to approximately 90° C. for 2 hours. The resulting capped glycol mixture contained isocyanate terminated polymeric glycol and residual unreacted diisocyanate. The reaction was allowed to continue until the measured weight percent isocyanate (% NCO) was in close agreement with theoretical values based on reaction of all glycol hydroxyl groups with isocyanate. The resulting capped glycol was then completely dissolved in DMAc at about 45° C. under high shear. The capped glycol solution was contacted, under high shear, with a DMAc solution containing the appropriate chain extender(s) and chain terminator(s). The resulting polymer solution was analyzed for weight percent solids, primary amine content (chain extender ends), pre-spun intrinsic viscosity, and 40° C. Falling ball viscosity. An additive solution was added to provide the final fiber with 1.5 weight percent CYANOX® 1790 (Cytec Industries), 0.5 weight percent METHACROL® 2462 (Dupont Co.), and 0.6 weight percent polydimethylsiloxane silicone oil. The polymer solution was then dry spun from DMAc into a column into which a stream of heated nitrogen was introduced. The resulting spandex filaments were coalesced, a spin finish was applied, and the fiber was wound onto a package.

The diisocyanate mixtures used in the examples were prepared by mixing ISONATE® MDR (Dow Chemical Co.) and MONDUR® ML (Bayer AG) in appropriate proportions to obtain the desired levels of 2,4'-MDI. ISONATE® MDR is 4,4'-MDI containing a small amount of 2,4'-MDI (approx. 1.9%). MONDUR® ML is a mixture of 4,4'-MDI (approx. 44.9%), 2,4'-MDI (approx. 53.2%) and 2,2'-MDI (approx. 2.2%).

The polyether glycol used in the examples was TER-ATHANE® 1800 (Dupont) a polytetramethyleneether glycol having a number average molecular weight of 1800. The chain extender was either ethylene diamine or a mixture of ethylenediamine (EDA) and 2-methyl-1,5-pentanediamine (DYTEK®A, available from Dupont).

Analytical Methods

Concentrations of the MDI isomers in the starting materials were determined by gas chromatographic analyses using a 15-meter DB-1701 capillary column, programmed from 150–230° C. at 8 degrees/min following an initial hold time of 2 min.

Intrinsic viscosity (IV) of the polyurethaneurea was determined by comparing the viscosity of a dilute solution of the polymer in DMAc to that of DMAc itself at 25° C. ("relative viscosity" method) in a standard Cannon-Fenske viscometer tube according to ASTM D2515 and is reported as dl/g.

The number of chain extender ends (CE) was determined by dissolving the polymer in DMAc followed by titration for primary amine content with methanesulfonic acid using bromophenol blue as the indicator.

To measure coefficient of denier variation (CDV), the first 50 meters of fiber at the surface of a wound spandex package were removed so that inaccuracies resulting from handling damage were avoided. Spandex was then removed for 130 seconds from the package using a rolling take-off and fed across a tensiometer comprising a piezoelectric ceramic pin. The take-up roll's circumference was 50% greater than the feed roll's circumference, and the feed and take-up rolls rotated at the same rpm, so that the polyurethane fiber was stretched to 50% elongation across the tensiometer. The tensiometer measured the tension as the spandex was fed through the rolls. The standard deviation of the tension was divided by the average tension to obtain the coefficient of variation since denier is directly proportional to the tension. CDV is independent of the linear density units used (denier vs. decitex), and low CDV indicates high fiber uniformity.

Percent isocyanate (% NCO) of the capped glycols was determined according to the method of S. Siggia, "Quantitative Organic Analysis via Functional Group", 3rd Edition, Wiley & Sons, New York, pages 559–561 (1963).

The strength and elastic properties of the spandex were measured in accordance with the general method of ASTM D 2731-72. Three filaments, a 2-inch (5-cm) gauge length and zero-to-300% elongation cycles were used for each of the measurements "as-is" from the windup, that is, without scouring or other treatment. The samples were cycled five times at a constant elongation rate of 50 cm per minute and then held at 300% extension for 30 seconds after the fifth extension. Load power, the stress on spandex during initial extension, was measured on the first cycle at 200% extension and is reported in the Tables in grams and designated "LP". Unload power, the stress at an extension of 200% on the fifth unload cycle, is also reported in grams; it is designated as "UP". Percent elongation at break ("Eb") and tenacity were measured on the sixth extension. Percent set was also measured on samples that had been subjected to five 0–300% elongation/relaxation cycles. Percent set ("% SET") was calculated as:

$$\% \text{ SET} = 100(Lf-Lo)/Lo$$

wherein Lo and Lf are the filament (yarn) length, when held straight without tension, before and after the five elongation/relaxation cycles, respectively.

Polyurethaneurea solution viscosity was determined in accordance with the general method of ASTM D1343-69 with a Model DV-8 Falling Ball Viscometer (Duratech Corp., Waynesboro, Va.), operated at 40° C. and is reported in poises. The highest solution viscosity that could be measured using this instrument was 35,000 poises.

Example 1

A polyurethaneurea polymer typically used to make spandex was prepared using TERATHANE® 1800 and ISONATE® MDR with a capping ratio of 1:1.69. The capped glycol had a % NCO of 2.6% and was diluted with DMAc to give a 45 percent solids solution. This solution was then contacted with a DMAc solution containing: a chain extending mixture of EDA and DYTEK® A (90/10 mole ratio); and diethylamine as a chain terminator, in proportions such that the resulting polymer solution had an intrinsic viscosity of 0.95, an initial solution viscosity of 2600 poises and was 34.8 percent solids with the number of chain extender ends measured to be 15 meq/kg of polymer solids. A 40 denier, 3 filament spandex yarn was spun from polymer solution at 950 yards per minute (ypm). Intrinsic viscosity of the spun yarn was 1.16.

Example 2

A polyurethaneurea polymer of this invention was prepared using a diisocyanate mixture containing 82% ISONATE® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity of 0.75, and an initial solution viscosity of 3300 poise and was 45 percent solids with the number of chain extender ends measured to be 40 meq/kg of polymer solids. A 40 denier, 3 filament spandex yarn was spun from polymer solution at 950 yards per minute (ypm). Intrinsic viscosity of the spun yarn was 1.34.

Example 3

A polyurethaneurea polymer was prepared using a diisocyanate mixture containing 82% ISONATE ® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity of 0.75, an initial solution viscosity of 3300 poise and was 45 percent solids with the number of chain extender ends measured to be 15 meq/kg of polymer solids. A 40 denier, 4 filament spandex yarn was spun from polymer solution at 950 yards per minute (ypm). Intrinsic viscosity of the spun yarn was 1.02.

Example 4

A polyurethaneurea polymer was prepared using a diisocyanate mixture containing 82% ISONATE® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity of 0.75, an initial solution viscosity of 3300 poise and was 45 percent solids with the number of chain extender ends measured to be 65 meq/kg of polymer solids. A 40 denier, 3 filament spandex yarn was spun from polymer solution at 950 yards per minute (ypm). Intrinsic viscosity of the spun yarn was 1.05.

Example 5

A polyurethaneurea polymer was prepared using a diisocyanate mixture containing 82% ISONATE® MDR and 18% MONDUR® ML. The capped glycol was prepared using TERATHANE® 1800 with a capping ratio of 1:1.69. The capped glycol was diluted to 55% solids with DMAc and reacted with a mixture of ethylene diamine and diethylamine in DMAc in proportions such that resulting polymer solution had an intrinsic viscosity (calculated) of approximately 0.95 (total ends approx. 55), with the number of chain extender ends measured to be 15 meq/kg of polymer solids. A 45% solids polymer solution could not be spun into fiber due to the high viscosity and gelling.

Example 6

A polyurethaneurea polymer typically used to make spandex was prepared using TERATHANE® 1800 and ISONATE® MDR with a capping ratio of 1.69. The capped glycol had a % NCO of 2.6% and was diluted with DMAc to give a 55 percent solids solution of the capped glycol. This solution was then contacted with a DMAc solution containing: ethylenediamine chain extender; and diethylamine as a chain terminator, in proportions such that the resulting polymer solution had 45 percent solids with the number of chain extender ends measured to be 40 meq/kg of polymer solids. The solution was highly unstable. The 40° C. falling ball viscosity increased over 10,000 poise in one hour. The intrinsic viscosity could not be measured and the polymer could not be spun.

A comparison of Example 2 (present invention) to Examples 3 and 4 shows that the combination of a proper diisocyanate balance, pre-spun IV and chain extender ends, provides a high-solids polymer solution that can be used to prepare commercially acceptable spandex, as defined in the Background Section of this application.

Examples 3 and 4 show that without the proper balance of chain extender ends and fiber IV, high-solids polymer solutions can be stable in terms of viscosity, and can be spun, but the spandex fiber will not be commercially acceptable, e.g., a fiber IV of less than 1.1 dl/gm.

Example 7

The polyurethaneurea polymer of Example 1 was used to make a 40 denier, two filament spandex yarn and was spun from polymer solution at 672 ypd. The fiber properties are reported in Table 2.

Example 8

The polyurethaneurea polymer of Example 2 was used to make a 40 denier, two filament spandex yarn and was spun from polymer solution at 672 ypd. The fiber properties are reported in Table 2.

Example 9

The polyurethaneurea polymer of Example 2 was used to make a 40 denier, two filament spandex yarn and was spun from polymer solution at 807 ypd. The fiber properties are reported in Table 2.

TABLE 1

| | Example | | | | | |
|---|---|---|---|---|---|---|
| | 1 | 2 | 3 | 4 | 5 | 6 |
| % 2,4'-MDI | 1.9 | 11.1 | 11.1 | 11.1 | 11.1 | 1.9 |
| C.R. | 1.69 | 1.69 | 1.69 | 1.69 | 1.69 | 1.69 |
| % Solids | 34.8 | 45 | 45 | 45 | 45 | 45 |
| Pre-spun IV | 0.95 | 0.75 | 0.75 | 0.75 | 0.95 Calculated | Not measurable |
| CE | 15 | 40 | 15 | 65 | 15 | 40 |
| Solution Viscosity (as made) | 2600 | 3200 | 3200 | 3200 | Not measurable | Not measurable |
| Fiber IV | 1.16 | 1.34 | 1.02 | 1.05 | Not measurable | Not measurable |
| Tenacity | 41.6 | 43.5 | 41.0 | 41.8 | — | — |
| LP | 6.9 | 5.4 | 4.8 | 5.7 | — | — |
| UP | 1.14 | 1.11 | 1.01 | 1.10 | — | — |
| CDV | 17.8 | 10.3 | 16.1 | 10.3 | — | — |
| Eb | 476 | 468 | 494 | 472 | — | — |

A comparison of Example 1 (prior art process) to Example 6 shows that merely adjusting the chain extender ends to the desirable level, without also controlling the diisocyanate balance, does not provide a high-solids polymer solution that can be used to prepare spandex.

A comparison of Example 2 (present invention) to Example 5 shows that having the desirable diisocyanate balance, but without the proper pre-spun IV and without the proper number of chain extender ends, does result in a high viscosity polymer solution that cannot be spun into spandex

TABLE 2

| | Example | | |
|---|---|---|---|
| | 7 | 8 | 9 |
| % 2,4'-MDI | 1.9 | 11.1 | 11.1 |
| C.R. | 1.69 | 1.69 | 1.69 |
| % Solids | 34.8 | 45 | 45 |

TABLE 2-continued

|  | Example | | |
|---|---|---|---|
|  | 7 | 8 | 9 |
| Pre-spun IV | 0.95 | 0.75 | 0.75 |
| CE | 15 | 40 | 40 |
| Solution Viscosity (as made) | 2600 | 3200 | 3200 |
| Spin rate (ypm) | 672 | 672 | 807 |
| Fiber IV | 1.4 | 1.6 | 1.43 |
| Tenacity | 54.6 | 41.6 | 45.4 |
| LP | 5.27 | 4.10 | 4.32 |
| UP | 1.15 | 1.00 | 1.01 |
| CDV | 21 | 9.5 | 9.8 |
| Eb | 546 | 556 | 513 |

Table 2 demonstrates that the present invention (Examples 8 and 9) provides high-solids polymer solutions that can be used to prepare commercially spandex with even greater consistency (lower CDV) than with prior art systems (Example 7).

Example 9 further illustrates that using the present invention spandex can be prepared at higher winding speeds, thus greater productivity, than using prior art systems. Note that commercially acceptable spandex was prepared at 807 ypm using the present invention (Example 9) whereas spandex of prior art Example 7 was spun at 672 ypm without achieving commercially acceptable properties (CDV>15). The prior art process of Example 7 would have to be operated at still lower speeds to achieve acceptable spandex properties.

What is claimed is:

1. A method of making a polyurethaneurea comprising the steps of:
   (a) contacting at least one polymeric glycol selected from the group consisting of polyether glycols and polyester glycols; with a diisocyanate mixture comprising at least about 78 mole percent 4,4'-MDI and at least about 5 mole percent 2,4'-MDI; wherein the molar ratio of the at least one glycol to the total moles of diisocyanate is between about 1:1.5 and about 1:2;
   (b) contacting the product of step (a) with a composition comprising:
      (1) a solvent selected from the group consisting of N,N-dimethylacetamide, dimethylformamide, dimethyl sulfoxide, N,N-dimethylpyrrolidinone, and mixtures thereof;
      (2) at least one chain extender wherein ethylenediamine is at least about 90 mole percent of the total moles of chain extenders;
      (3) at least one chain terminator
   to form a polymer, wherein the pre-spun intrinsic viscosity ("IV") of the polymer is between about 0.65 and about 0.90 dl/g and the primary amine content is between about 25 and about 55 meq/Kg.

2. The method of claim 1 wherein: (i) the polymeric glycol is a polyether glycol having a number average molecular weight between about 1600 and about 2500; (ii) the molar ratio of the at least one glycol to the total moles of diisocyanate is between about 1:1.6 and about 1:1.8; (iii) the diisocyanate mixture comprises between about 80 and about 95 mole percent 4,4'-MDI and further comprises between about 5 and about 20 mole percent 2,4'-MDI; and (iv) at least one chain terminator is a secondary amine.

3. The method of claim 2 wherein: (i) the polyether glycol has a number average molecular weight between about 1800 and about 2000 and is selected from the group consisting of polyethyleneether glycol, polytrimethyleneether glycol, polytetramethyleneether glycol, polytetramethylene-co-2methyl-tetramethyleneether) glycol, polytetramethylene-co-tetraethyleneether glycol, and mixtures thereof; (ii) at least one secondary chain extender is present and selected from 2-methyl-1,5-pentanediamine and 1,2-propanediamine; and (iii) at least one chain terminator is selected from the group consisting of diethylamine, diisopropylamine, piperidine, and dibutylamine.

4. The method of claim 3 wherein: (i) the polyether glycol is polytetramethyleneether glycol having a number average molecular weight of about 1800; (ii) the diisocyanate mixture comprises between about 83 and about 91 mole percent 4,4'-MDI and further comprises between about 9 and about 17 mole percent 2,4'-MDI and further comprises less than 1 mole percent 2,2'-MDI; (iii) the at least one chain terminator is diethylamine; and (iv) the solvent is N,N-dimethylacetamide.

5. The method of claim 1 wherein: (i) the pre-spun intrinsic viscosity ("IV") is between about 0.70 and about 0.80 dl/g; and (ii) the primary amine content is between about 35 and about 45 meq/Kg.

6. The method of claim 5 wherein: (i) the pre-spun intrinsic viscosity ("IV") is about 0.75; and (ii) the primary amine content is about 40 meq/Kg.

7. A polyurethaneurea polymer formed by the reaction of:
   (a) at least one polymeric glycol selected from the group consisting of polyether glycols and polyester glycols;
   (b) a diisocyanate mixture comprising at least about 78 mole percent 4,4'-MDI and at least about 5 mole percent 2,4'-MDI; wherein the molar ratio of the at least one glycol to the total moles of diisocyanate is between about 1:1.5 and about 1:2; and
   (c) a composition comprising:
      (1) at least one chain extender wherein ethylenediamine is at least about 90 mole percent of the total moles of chain extenders; and
      (2) at least one chain terminator;
   wherein the resulting polyurethaneurea polymer has a pre-spun intrinsic viscosity ("IV") between about 0.65 and about 0.90 dl/g and a primary amine content between about 25 and about 55 meq/Kg.

8. The polyurethaneurea polymer of claim 7 wherein: (i) the polymeric glycol is a polyether glycol having a number average molecular weight between about 1600 and about 2500; (ii) the molar ratio of the at least one glycol to the total moles of diisocyanate is between about 1:1.6 and about 1:1.8; (iii) the diisocyanate mixture comprises between about 80 and about 95 mole percent 4,4'-MDI and further comprises between about 5 and about 20 mole percent 2,4'-MDI; and (iv) at least one chain terminator is a secondary amine.

9. The polyurethaneurea polymer of claim 5 wherein: (i) the polyether glycol has a number average molecular weight between about 1800 and about 2000 and is selected from the group consisting of polyethyleneether glycol, polytrimethyleneether glycol, polytetramethyleneether glycol, polytetramethylene-co-2-methyl-tetramethyleneether) glycol, polytetramethylene-co-tetraethyleneether glycol, and mixtures thereof; (ii) at least one secondary chain extender is present and selected from 2-methyl-1,5-pentanediamine and 1,2-propanediamine; and (iii) at least one chain terminator is selected from the group consisting of diethylamine. diisopropylamine, piperidine, and dibutylamine.

10. The polyurethaneurea polymer of claim 9 wherein: (i) the polyether glycol is polytetramethyleneether glycol having a number average molecular weight of about 1800; (ii) the diisocyanate mixture comprises between about 83 and about 91 mole percent 4,4'-MDI and further comprises between about 9 and about 17 mole percent 2,4'-MDI and further comprises less than 1 mole percent 2,2'-MDI; and (iii) the at least one chain terminator is diethylamine.

11. The polyurethaneurea polymer of claim 7 wherein: (i) the pre-spun intrinsic viscosity ("IV") is between about 0.70 and about 0.80 dl/g; and (ii) the primary amine content is between about 35 and about 45 meq/Kg.

12. The polyurethaneurea polymer of claim 11 wherein: (i) the pre-spun intrinsic viscosity ("IV") is about 0.75; and (ii) the primary amine content is about 40 meq/Kg.

13. A method of making spandex fiber comprising the steps of:
   (a) preparing a polymer solution comprising:
      (1) a solvent selected from the group consisting of N,N-dimethylacetamide, dimethylformamide, dimethyl sulfoxide; N,N-dimethylpyrrolidinone, and mixtures thereof; and
      (2) a polyurethaneurea prepared from at least one polymeric glycol and a diisocyanate mixture comprising at least about 78 mole percent 4,4'-MDI and at least about 5 mole percent 2,4'-MDI at least one chain extender and at least one chain terminator, wherein the polyurethaneurea has a pore-spun intrinsic viscosity ("IV") of between about 0.65 and about 0.9 dl/g and a primary amine content between about 25 and about 55 meq/Kg;
   wherein the solids content of the polyurethaneurea in the polymer solution is greater than 38 and less than 50 weight percent; and
   (b) dry spinning the polymer solution to form spandex fiber having the following properties at 40 denier: an intrinsic viscosity ("IV") greater than 1.1 dl/g; a tenacity of at least 40 g; a load power less than 7 g; an unload power at least 0.9 g; and a coefficient of denier variation ("CDV") of less than 15.

14. The method of claim 13 wherein the solids content is between about 40 and about 48 weight percent.

15. The method of claim 14 wherein the solids content is about 45 weight percent.

16. The method of claim 15 wherein the solvent is the solvent is N,N-dimethylacetamide.

17. Spandex prepared from a polyurethaneurea polymer formed by the reaction of:
   (a) at least one polymeric glycol selected from the group consisting of polyester glycols and polyester glycols;
   (b) a diisocyanate mixture comprising at least about 78 mole percent 4,4'-MDI and at least about 5 mole percent 2,4'-MDI; wherein the molar ratio of the at least one glycol to the total moles of diisocyanate is between about 1:1.5 and about 1:2; and
   (c) a composition comprising:
      (3) at least one chain extender wherein ethylenediamine is at least about 90 mole percent of the total moles of chain extenders; and
      (4) at least one chain terminator;
   wherein the polyurethaneurea polymer, used to make the spandex, has a pre-spun intrinsic viscosity ("IV") between about 0.65 and about 0.90 dl/g and has a primary amine content between about 25 and about 55 meq/Kg.

18. The spandex of claim 17 wherein: (i) the polymeric glycol is a polyether glycol having a number average molecular weight between about 1600 and about 2500; (ii) the molar ratio of the at least one glycol to the total moles of diisocyanate is between about 1:1.6 and about 1:1.8; (iii) the diisocyanate mixture comprises between about 80 and about 95 mole percent 4,4'-MDI and further comprises between about 5 and about 20 mole percent 24'-MDI; and (iv) at least one chain terminator is a secondary amine.

19. The spandex of claim 18 wherein: (i) the polyether glycol has a number average molecular weight between about 1800 and about 2000 and is selected from the group consisting of polyethyleneether glycol, polytrimethyleneether glycol, polytetramethyleneether glycol, polytetramethylene-co-2-methyl-tetramethyleneether, glycol, polytetramethylene-co-tetraethyleneether glycol, and mixtures thereof; (ii) at least and one secondary chain extender is present and selected from 2-methyl-1,5-pentanediamine and 1,2-propanediamine; and (iii) at least one chain terminator is selected from the group consisting of diethylamine, diisopropylamine, piperidine, and dibutylamine.

20. The spandex of claim 19 wherein: (i) the polyether glycol is polytetramethyleneether glycol having a number average molecular weight of about 1800; (ii) the diisocyanate mixture comprises between about 83 and about 91 mole percent 4,4'-MDI and further comprises between about 9 and about 17 mole percent 2,4'-MDI and further comprises less than 1 mole percent 2,2'-MDI; and (iii) the at least one chain terminator is diethylamine.

21. The spandex of claim 17 wherein: (i) the pre-spun intrinsic viscosity ("IV") is between about 0.70 and about 0.80 dl/g; and (ii) the primary amine content is between about 35 and about 45 meq/Kg.

22. The spandex of claim 21 wherein: (i) the pro-spun intrinsic viscosity ("IV") is about 0.75; and (ii) the primary amine content is about 40 meq/Kg.

23. Spandex prepared by the steps comprising:
   (a) preparing a polymer solution comprising:
      (1) a solvent selected from the group consisting of N,N-dimethylacetamide, dimethylformamide, dimethyl sulfoxide, N,N-dimethylpyrrolidinone, and mixtures thereof; and
      (2) a polyurethaneurea prepared from at least one polymeric glycol and a diisocyanate mixture comprising at least about 78 mole percent 4,4'-MDI and at least about 5 mole percent 2,4'-MDI, at least one chain extender and at least one chain terminator, wherein the polyurethaneurea has a pre-spun intrinsic viscosity ("IV") of between about 0.65 and about 0.9 dl/g and a primary amine content between about 25 and about 55 meq/Kg;
   wherein the solids content of the polyurethaneurea in the polymer solution is greater than 38 and less than 50 weight percent; and
   (b) dry spinning the polymer solution
   wherein the spandex produced has the following properties at 40 denier: an intrinsic viscosity ("IV") greater than 1.1 dl/g; a tenacity of at least 40 g; a load power less than 7 g; an unload power at least 0.9 g; and a coefficient of denier variation ("CDV") of less than 15.

24. The spandex of claim 23 wherein the solids content is between about 40 and about 48 weight percent.

25. The spandex of claim 24 wherein the solids content is about 45 weight percent.

26. The spandex of claim 25 wherein the solvent is the solvent is N,N-dimethylacetamide.

* * * * *